(12) United States Patent
Braghiroli

(10) Patent No.: US 7,199,873 B2
(45) Date of Patent: Apr. 3, 2007

(54) METHOD AND APPARATUS FOR BALANCING A MOTOR VEHICLE WHEEL

(75) Inventor: Francesco Braghiroli, Reggio Emila (IT)

(73) Assignee: Snap-On Equipment SRL a Unico Socio, Correggio (IT)

( * ) Notice: Subject to any disclaimer, the term of this patent is extended or adjusted under 35 U.S.C. 154(b) by 250 days.

(21) Appl. No.: 10/765,275

(22) Filed: Jan. 28, 2004

(65) Prior Publication Data

US 2005/0165509 A1    Jul. 28, 2005

(51) Int. Cl.
*G01B 11/26* (2006.01)
*G01C 1/00* (2006.01)

(52) U.S. Cl. .............................. 356/139.09; 356/139.04

(58) Field of Classification Search ........... 356/139.04, 356/139.09, 155; 73/460–462; 301/5.21
See application file for complete search history.

(56) References Cited

U.S. PATENT DOCUMENTS

| | | | |
|---|---|---|---|
| 4,084,350 A * | 4/1978 | Ongaro | 451/5 |
| 5,054,918 A | 10/1991 | Downing et al. | |
| 5,189,912 A * | 3/1993 | Quinlan et al. | 73/462 |
| 5,245,867 A | 9/1993 | Sube et al. | |
| 5,506,683 A | 4/1996 | Yang et al. | |
| 5,619,587 A * | 4/1997 | Willoughby et al. | 382/141 |
| 5,915,274 A | 6/1999 | Douglas | |
| 6,069,966 A | 5/2000 | Jones et al. | |
| 6,122,957 A * | 9/2000 | Bux et al. | 73/66 |
| 6,244,198 B1 | 6/2001 | Suominen | |
| 6,484,574 B1 * | 11/2002 | Douglas et al. | 73/462 |
| 6,535,281 B2 | 3/2003 | Conheady et al. | |
| 6,983,656 B2 * | 1/2006 | Cullum et al. | 73/487 |

FOREIGN PATENT DOCUMENTS

| | | |
|---|---|---|
| EP | 0 565 320 A2 | 10/1993 |
| WO | WO 96/10727 | 4/1996 |
| WO | WO 00/42409 | 7/2000 |

\* cited by examiner

*Primary Examiner*—Thomas H. Tarcza
*Assistant Examiner*—Isam Alsomiri
(74) *Attorney, Agent, or Firm*—McDermott Will & Emery LLP

(57) ABSTRACT

A method and apparatus for balancing a motor vehicle wheel, in which after an unbalance measuring operation, at least one balancing weight is attached to at least one balancing plane in a given angular position of the rim of the motor vehicle wheel. The rim surface is scanned to determine its contour features. The contour features are compared to reference contour features of stored rim surfaces, to determine matching rim types and at least one balancing plane associated with the best match.

10 Claims, 2 Drawing Sheets

METHOD AND APPARATUS FOR BALANCING A MOTOR VEHICLE WHEEL

RELATED APPLICATIONS

This application is related to a co-pending patent application Ser. No. 10/765,207, titled "METHOD AND APPARATUS FOR OPTICALLY SCANNING A PNEUMATIC TIRE OF A VEHICLE WHEEL," filed concurrently herewith; a co-pending patent application Ser. No. 10/765,206, now U.S. Pat. No. 7,065,444, issued Jun. 20, 2006, entitled "METHOD OF MATCHING VEHICLE WHEEL," filed concurrently herewith; and a co-pending patent application Ser. No. 10/765,274, entitled "METHOD AND APPARATUS FOR OPTICALLY SCANNING A VEHICLE WHEEL," filed concurrently herewith. All of the applications are commonly assigned to the assignee of this application, and are incorporated herein by reference in their entireties.

FIELD OF THE DISCLOSURE

This disclosure concerns a method and an apparatus for balancing a motor vehicle wheel, in which after an unbalance measuring operation, at least one balancing weight is attached to at least one balancing plane in a given angular position of the rim of the motor vehicle wheel.

BACKGROUND AND SUMMARY OF THE DISCLOSURE

U.S. Pat. No. 6,535,281, titled "Method and apparatus for optically scanning a vehicle wheel," discusses a method an apparatus for scanning a motor vehicle wheel with an optical scanning device for the detecting geometrical wheel data. The entire disclosure of the patent is incorporated herein by reference. During calculation of the angular position and the size of the balancing weights to be fitted in the balancing planes, the required geometrical wheel data are evaluated.

Another U.S. Pat. No. 6,122,957, entitled "Wheel-balancing method and device," discusses a method for ascertaining the contour of the rim during a wheel balancing process, and for determining optimum balancing positions for balancing weights based on the contour and the size of the balancing weights from the measurement results of the unbalance measuring operation. The entire disclosure of the patent is incorporated herein by reference.

U.S. Pat. No. 5,189,912, entitled "Ultrasonic wheel measuring apparatus and wheel balancer incorporating same," discusses a method for determining the type of standardised motor vehicle wheels based on scanned geometry data, and determining the associated axial positions for fitting balancing weights. The entire disclosure of the patent is incorporated herein by reference.

This disclosure describes an improved method and apparatus for balancing a wheel, by which positions suited to types of rim or types of wheel for fixing balancing weights are determined.

According to one embodiment, contour features of the rim surface to which balancing weights can be fixed are detected. The detected contour features are compared to stored contours or contour features of a plurality of types of rims or types of wheels. Balancing planes that are suitable for those stored types of rims or wheels, or regions in which the balancing planes can be found, are predetermined. Based on the comparison result, at least one balancing plane of the type of rims or wheels that has the best match with the motor vehicle wheel corresponding to the contour or contour features of the rim surface can be determined. Based on the determined balancing plane or planes, the angular position and size of the balancing weight or weights are calculated, derived from the measurement values obtained in the unbalance measuring operation.

Relevant contour features of the rim of a motor vehicle wheel include flat surface portions, rim surface portions extending in parallel relationship with the axis of the wheel, parts of the rim surface adjacent to the wheel disc portion or to the spokes of the wheel, and rim flanges. Those rim surface portions are suitable for fixing balancing weights. The at least one balancing plane is disposed within those surface portions. For a dynamic balancing procedure, two balancing planes are determined in those surface portions; while for a static balancing procedure, it is sufficient to determine only one balancing plane. In one embodiment, adhesive weights are fixed in the flat surface portions, in particular surface portions extending in parallel relationship with the axis of the wheel. Clip-type weights may also be used to attach to the rim flanges.

According to another embodiment, when determining the type of rims or wheels, determination of contour features that are not suitable for fixing balancing weights is also made. Contour features that are not suitable for fixing balancing weights include steps in the rim surface or surface portions, which extend inclinedly or approximately perpendicularly to the axis of the wheel.

According to still another embodiment, in determination of the contour features, the spacing of the respective contour features from a reference plane or a reference point on the balancing machine are determined by a scanning device. During determination of the type of rim or wheel, additional parameters, such as the rim material (steel or aluminium), the rim width, the rim diameter and the wheel diameter, are determined by the scanning device. Examples of optical scanning devices are described in, for example, U.S. Pat. No. 6,535,281, entitled "METHOD AND APPARATUS FOR OPTICALLY SCANNING A VEHICLE WHEEL," the entire disclosure of which is incorporated herein by reference. According to one embodiment, three optical scanning devices are used, wherein a scanning device is provided for scanning the inside of the wheel, the outside of the wheel, and the wheel peripheral running surface, respectively. A laser beam is used for the scanning operation.

The optical scanning beam can further serve for marking the balancing positions when the wheel to be balanced is moved into the appropriate angular position. In that case, a change in the axial position of one or both balancing planes can be implemented by the optical scanning beam being displaced or pivoted. In that case, the point of impingement of the optical scanning beam lies in the corrected balancing plane. That modification can be effected by the operator. An evaluation device of the balancing machine then re-calculates the angular position and size of the balancing weight, for the new balancing plane. It is possible to provide optimum positioning of the balancing weight on the surface of the rim.

The data related to the detected contour features or the contour of the rim are stored with the geometrical data with respect to the axial position of the at least one associated balancing plane. If, for example, a set of four vehicle wheels of a motor vehicle is to be balanced, the stored data can be used for the subsequent balancing operations on that set of motor vehicle wheels. In addition, the stored data can be used for improved representation of the types of rim or wheel for implementing a learning process for the storage and calculating system in the evaluation device. The data can be used to balance other vehicle wheels of the same or a similar type. The learning process is advantageous, particularly in relation to light metal or alloy wheels such as aluminium wheels with a wide range of types.

Additional aspects and advantages of the present disclosure will become readily apparent to those skilled in this art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The accompanying drawings, which are incorporated in and constitute a part of the specification, illustrate exemplary embodiments.

DETAILED DESCRIPTION OF THE DISCLOSURE

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Figure 1:
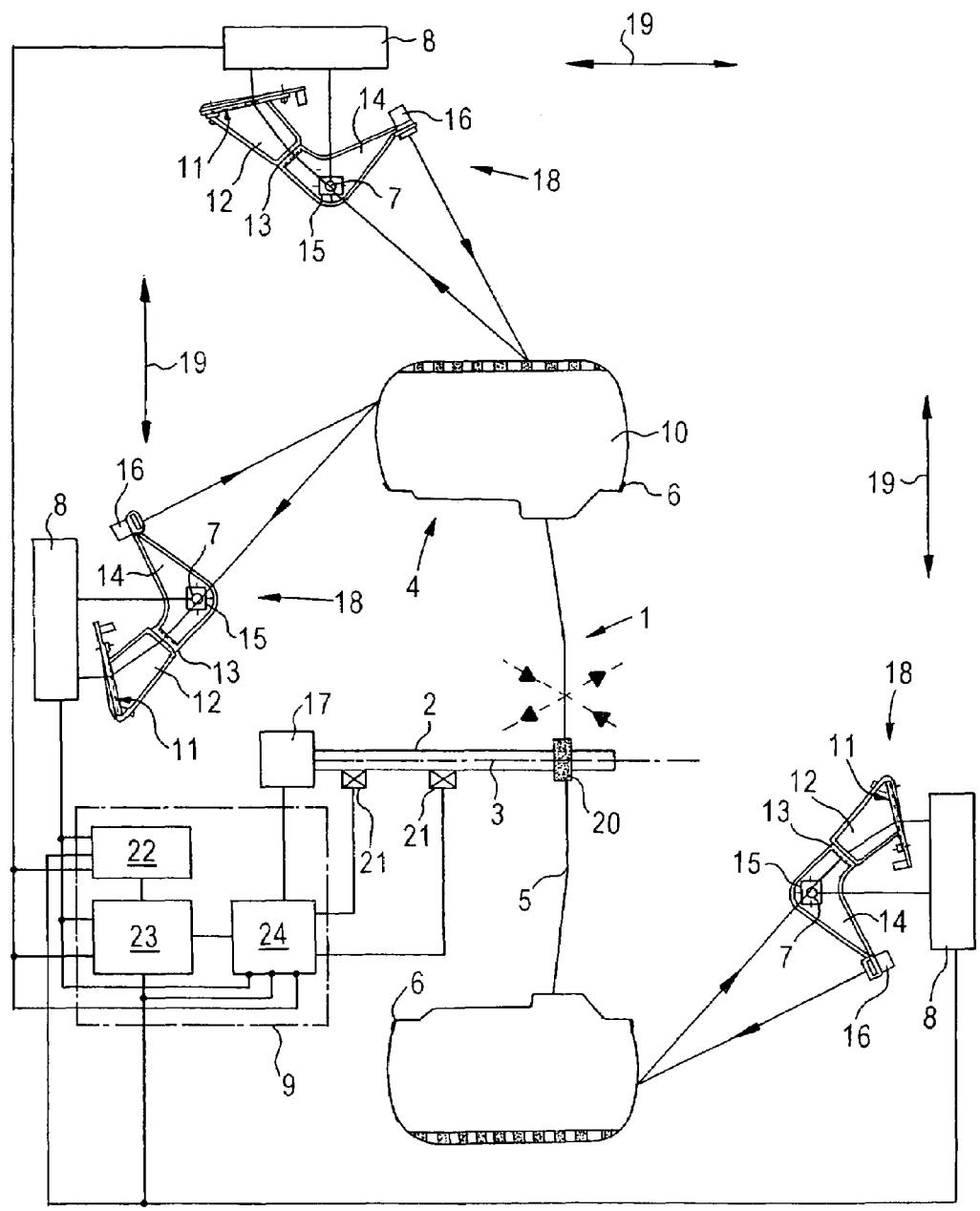
FIG. 1 shows an exemplary system for carrying out the wheel balancing process described in this disclosure.

FIG. 1 shows an exemplary system for carrying out the wheel balancing process described in this disclosure. In FIG. 1, a vehicle wheel 1 has a wheel disc portion 5 and a rim 4 fixed to the periphery of the wheel disc portion 5. A pneumatic tire 10 is mounted on the rim 4. Tire beads are supported in known manner at rim flanges 6 of the rim 4.

The vehicle wheel 1 is fixed in known manner to a measuring shaft 2 of a wheel balancing machine (not shown), and is rotatably supported on a rotation axis defined by the measuring shaft 2. When the wheel is clamped in position in centered relationship, the measuring shaft coincides with a wheel axis 3 to ensure that the wheel axis 3 is stationary relative to the wheel balancing machine.

The dimensions and positions of constituent parts of the vehicle wheel 1 can be measured with one or more scanning devices 18 and ascertained with a computer. Each scanning device 18 includes a light source 16, such as a laser. In addition, each device 18 includes a receiver 12, such a CCD-sensor, as a position-sensitive receiving element. The light source 16 and the receiver 12 are fixed to a carrier 14. The carrier 14 is supported pivotably about a pivot axis 7. The carrier 14 can also be movably mounted linearly (double-headed arrow 19) or on a predetermined guide path with respect to the measuring shaft 2 and a fixing position 20 of the vehicle wheel 1 to the measuring shaft 2. The pivotal movement and the optionally additional linear or guided movement can be implemented by means of a drive (not shown), for example in the form of one or more stepping motors. A receiver optical system 13 is also provided on the carrier 14. The receiver optical system 13 and the CCD-sensor 11 are constituent parts of the receiver 12.

The light source 16 emits a light beam on to the surface of the vehicle wheel 1. The light beam is reflected by the surface, and passes through the focusing receiver optical system 13 on to the sensor elements of the CCD-sensor 11. The CCD-sensor 11 can detect a plurality of local maxima of an illumination intensity function, separately from each other. The direction of the reflected beam depends on the distance of the location scanned on the vehicle wheel 1, with respect to the light source 16. Based on that distance, the reflected beam is directed by the receiver optical system 13 on to a given location of the CCD-sensor 11, and then converted into a position-sensitive or position-dependent signal. That signal is passed to an electronic measuring arrangement 8 coupled to a position sensor 15. The position sensor 15 supplies the electronic measuring arrangement 8 with position signals that are relative to the respective positions of the light source 16 and the CCD-sensor 11. The light source 16 and the receiver 12 move together with each other as they are fixed to the common carrier 14. The position signals are related to a reference position on the machine (not shown), and are thus related to the measuring shaft 2 mounted stationarily at the machine and the axial fixing position 20 at which the vehicle wheel 1 is fixed to the measuring shaft 2.

The electronic measuring arrangement 8 produces measurement signals corresponding to the positions of the surface locations of the motor vehicle wheel 1, which are scanned by the light beams emitted by the light source 16.

All surface points of the motor vehicle wheel 1 and in particular all surface points on the wheel disc portion 5 and the rim 4 can be detected by three scanning devices 18, each associated with the inside of the motor vehicle wheel (left-hand scanning device 18 in FIG. 1), and the outside of the vehicle wheel 1 (right-hand scanning device 18 in FIG. 1), respectively. Examples of scanning devices are described in U.S. Pat. No. 6,535,281, titled "Method and apparatus for optically scanning a vehicle wheel," previously incorporated in this application by reference. It is however also possible to use only one scanning device 18 that moves into suitable measuring positions on a predetermined guide path both at the inside and at the outside of the vehicle wheel 1.

In order to detect all surface spots of the vehicle wheel 1, the wheel 1 can be mounted rotatably about the wheel axle 3 with the measuring shaft 2. The electronic measuring arrangement 8 that furnishes the corresponding measurement signals can be a constituent part of the respective scanning device 18. Alternatively, the electronic measuring arrangement 8 may be integrated into an evaluation device 9 that includes a computer 24. By virtue of the described measuring arrangement, dimensions and positions of constituent parts of the vehicle wheel 1 as well as properties of those constituent parts can be determined and evaluated by the evaluation device 9 in a computer-aided procedure.

Based on the measuring arrangement described above, it is possible to convey information related to locations scanned at the surface of the rim 4, to the evaluation device 9, which determines the profile of the rim surface 4 based on the information. The profile of the rim includes locations at which balancing weights, for example adhesive weights, are to be arranged when balancing the vehicle wheel 1. In that respect, the rim surface is scanned at the inside of the wheel, by the left-hand scanning device 18 illustrated in FIG. 1. The rim contour can also be scanned at the outside of the wheel in the same manner.

It is also possible to scan the shapes of the rim flanges 6. The respective scanning device 18 is suitably positioned for that purpose, and the light beam emitted by the light source is directed from different directions on to the respective rim flange. The profile or the shape of the rim flange can then be detected by pivotal movement and optionally straight movement, or movement guided in some other fashion, of the scanning device 18. The shape of the rim flange also affords a reference to the vehicle manufacturer. The service operator can then obtain indications about the choice of the balancing weights to be used, from the corresponding data bank.

It is also possible to measure the thickness of the wheel disc portion 5. For that purpose, both sides of the surface of the disc wheel portion 5 are scanned (shown by the broken-line illustrations of the emitted and reflected beams in FIG. 1). The thickness of the wheel disc portion 5 can be ascertained in the evaluation device 9 based on the information measuring the both sides of the wheel disc portion 5.

The wheel type can be determined based on the measured geometrical data in respect of the wheel disc portion 5 and the rim 6, and from the ascertained form of the rim flanges 6. The procedure provides information related to whether the wheel involves a disc wheel and has a steel rim or a light metal rim, such as aluminium.

The operation of detecting the rotary angular positions of the vehicle wheel 1 is effected in conjunction with rotary angle signals that are delivered to the evaluation device 9 by a rotary angle sensor 23 coupled to the measuring shaft 2. It is known for a rotary angle sensor of that kind to be connected to the measuring shaft 2 in a wheel balancing machine.

The scanning device 18 that scans the inside of the vehicle wheel is mounted pivotably to the machine frame of the balancing machine (not shown). Examples of the structure are described in , as is known for example from U.S. Pat. No. 6,535,281, titled "Method and apparatus for optically scanning a vehicle wheel," previously incorporated in this application by reference. The scanning device 18 for scanning the outside surface of the vehicle wheel 1 (the right-hand scanning device 18 in FIG. 1) can be provided on a pivotable frame, in particular on a wheel guard hood (not shown). According to one embodiment, the scanning device 18 is mounted pivotably. Alternatively, the scanning device 18 can also be mounted to the pivotable frame or the wheel guard hood displaceably linearly (double-headed arrow 19).

The scanned geometrical data that determine the overall contour or relevant contour features of the rim are fed to a comparator 23 in the evaluation device 9. The evaluation device 9 further includes a memory 22 in which contour features or contours of different types of rim or wheel are stored. Axial positions or positional regions of associated balancing planes are stored corresponding to those stored contour features or contours, and can be accessed from the memory 22.

Figure 2:
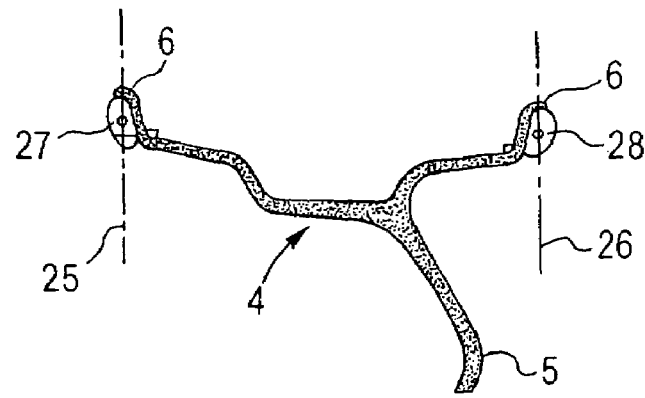
FIG. 2 depicts various fixing positions for different types of rim or wheel.
Figure 2:
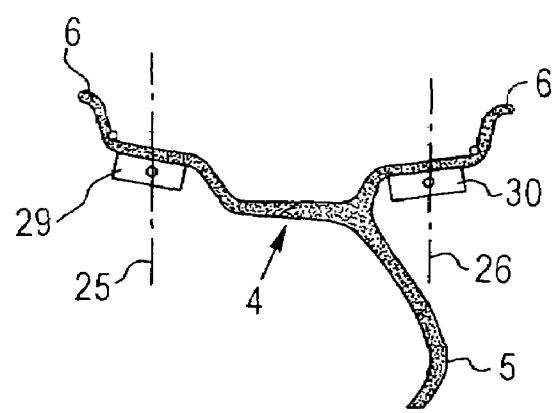
Figure 2:
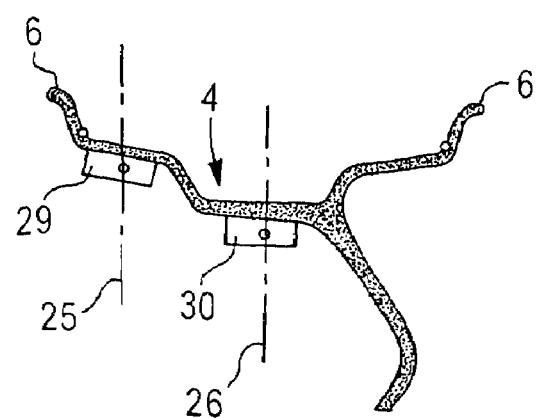

FIG. 2 illustrates three different types of rim, and their respective associated balancing planes 25, 26. For the sake of simplicity, the rims are shown as involving the same profile representation. It is known that other types of rims can be used. The rim shown at the top in FIG. 2 involves a steel rim or a light metal or alloy wheel in which the rim flanges 6 are designed such that clip-type weights 27, 28 can be fixed thereto.

The wheels shown at the centre and at the bottom of FIG. 2 involve light metal or alloy rims, in particular aluminium rims. Those types of rim have surface regions arranged around the axis of the wheel, which adhesive weights 29, 30 can be disposed in balancing planes 25, 26. The balancing planes 25, 26 are also stored in the memory 22. The surface regions to which the adhesive weights 29, 30 can be fixed are disposed in substantially parallel relationship with the axis 3 of the wheel or are only slightly inclined with respect to the axis 3. In addition, surface regions in which the balancing planes 26 occur are disposed at the outside or inside directly adjacent to the wheel disc portion 5 or the spokes provided at that location.

For the comparison procedure, at least the relevant contour features, for example, the surface portions of the rim in which the balancing weights can be arranged, are captured in the memory 22 and compared to the relevant contour features of the vehicle wheel to be balanced. The inwardly disposed (left-hand) scanning device 18 and the outwardly disposed (right-hand) scanning device 18 can be used to determine the thickness of the rim material, the rim width, the rim diameter and the wheel diameter, as further parameters for determining the type of rim or wheel. Those parameters can also be stored in association with the types of wheel or rim in the memory. Comparison of the contours or the relevant contour features is performed by the comparator 23, based on, for example, pattern matching techniques.

According to one embodiment, the best matching pattern is chosen as the pattern that minimises a weighted sum of the distances of each feature in the current pattern with the corresponding feature in the pre-established stored pattern. The distance or metric function to be used can be the Euclidean distance, the absolute difference distance, the maximum distance and so on. Other pattern matching techniques are known from literature.

The matching procedure can be performed in an iterative manner. For example, rim contours only can be compared first and a subset of candidates of best match stored patterns can be selected. This subset is compared again with respect to typical rim parameters to pick the final best match.

Another option is to compare one portion of the rim contour first (such as the rim flange), and select a subset of candidates of best match stored patterns based on that. Other portions are compared only to the patterns in the subset to determine the best match. This approach can save time in the pattern matching procedure.

Based on the forces measured by the force measuring sensors 21 during an unbalance measuring operation, and the associated rotary angle positions that are determined with the rotary angle sensor 17, the angular positions and sizes of the balancing weights are calculated in the computer 24 of the evaluation device 9. The computer 24 is connected to the comparison device 23, the rotary angle sensor 17 and the force measuring sensors 21.

When dealing with types of rim with which adhesive weights are used (central and lower rims shown in FIG. 2), the fixing location for the balancing weight can be identified on the rim surfaces by means of the light beam, which is emitted by the light source 16 of the inner or the outer scanning device 18, when the motor vehicle wheel 1 is moved into the appropriate rotary angular balancing position. The marking procedure is described in U.S. Pat. No. 6,244,108, titled "Wheel balancer," the disclosure of which is incorporated herein in its entirety.

The above-described process also allows an operator to alter the axial position of the respective balancing plane 25 or 26. In that way, the impingement point of the light beam directed on to the rim surface is displaced into the desired position and that change in position is notified to the computer 24. The computer then determines, for the modified balancing plane, the associated angular position and the size of the balancing weight, in particular an adhesive weight 29 or 30.

That modified axial position of the balancing plane and the associated geometrical data related to the rim 4, and optionally the additional parameters of the vehicle wheel 1, are inputted into and stored in the memory 22. If wheels of the same type are subsequently balanced, the stored data can be used to establish the balancing planes. In addition, those data can be stored in conjunction with a learning process, thereby providing for refinement and differentiated division of the various types of rim and wheel whose geometrical data are stored in the memory 22, with associated balancing planes. The functions of the memory, the comparator and the computer can also be integrated in a computing unit of the evaluation device 9.

The disclosure has been described with reference to specific embodiments thereof. It will, however, be evident that various modifications and changes may be made thereto without departing from the broader spirit and scope of the disclosure. The concepts described in the disclosure can apply to various operations of the networked presentation system without departing from the concepts. The specification and drawings are, accordingly, to be regarded in an illustrative rather than a restrictive sense.

What is claimed is:

1. A method for balancing a motor vehicle wheel, comprising the steps of:
   detecting relevant contour features of the wheel or the rim of the wheel;
   accessing data related to contour features of a plurality of types of rim or wheel;
   comparing the detected contour features to the accessed contour features; and
   among the plurality of types of rim or wheel, determining a best matching rim or wheel based on a result of the comparing step; and
   determining at least one balancing plane associated with the best matching rim or wheel.

2. The method of claim 1, further comprising the steps of:
   accessing information related to a result to a result of an unbalance measurement; and
   determining an angular position and size of a balancing weight based on the information related to the result of an unbalance measurement.

3. The method according to claim 1, wherein the relevant contour features include at least one of rim flanges, a flat surface portion of the rim, a rim surface extending in parallel relationship with the axis of the wheel, and a rim surface adjacent to the wheel disc portion or the wheel spokes.

4. A method according to claim 1, further comprising the step of detecting at least one of the features comprising rim material, rim width, rim diameter and wheel diameter of the wheel, wherein:
   the accessing step further accesses data related to wheel features of a plurality of types of rim or wheel corresponding to the at least one detected feature; and
   the comparing step further compares the at least one detected feature to the accessed data corresponding to the at least one detected feature.

5. A method according to claim 1, wherein the relevant contour features of the rim is determined by scanning the rim stepwise using an optical scanning measuring procedure.

6. A method according to claim 5, further including the steps of:
   altering the axial position of the at least one balancing plane on which an optical scanning beam of the scanning device is directed, for marking the altered axial position,
   wherein the angular position and the size of the balancing weight are calculated based on the altered axial position.

7. A method according to claim 1, wherein data related to the detected contour features of the rim are stored with an axial position of the at least one associated balancing plane.

8. A method according to claim 7, wherein the stored data are used for balancing vehicle wheels of other vehicles of the same or a similar type.

9. An apparatus for balancing a motor vehicle wheel including:
   a measuring shaft to which a motor vehicle wheel to be balanced is affixed;
   a measuring device for measuring forces resulting from an unbalance of the vehicle wheel;
   an optical scanning device for obtaining geometrical data related to contour features of the rim or the vehicle wheel; and
   an evaluation device coupled to the scanning device and the measuring device;
   wherein the evaluation device includes:
   memory in which contour features related to a plurality of types of rims or wheels and information related to balancing planes associated with a respective rim or wheel are stored; and
   a data processing device, coupled to the memory, configured to perform the steps of:
   accessing the stored contour features;
   comparing the geographical data related to contour features of the rim or the vehicle wheel to the accessed contour features; and
   among the plurality of types of rims or wheel, determining a best matching rim or wheel based on a result of the comparing step; and
   determining at least one balancing plane associated with the best matching rim or wheel.

10. The apparatus of claim 9, wherein the data processing device is configured to further perform the steps of:
    ascertaining the axial position of the at least one balancing plane of the best matching rim or wheel; and
    calculating an angular position and a size of at least one balancing weight to be attached to the ascertained balancing plane.

* * * * *